(12) United States Patent
Nag

(10) Patent No.: US 11,886,193 B1
(45) Date of Patent: Jan. 30, 2024

(54) METHODS AND APPARATUS FOR USING SCENE-BASED METRICS TO GATE READINESS OF AUTONOMOUS SYSTEMS

(71) Applicant: Nuro, Inc., Mountain View, CA (US)

(72) Inventor: Sreeja Nag, Mountain View, CA (US)

(73) Assignee: NURO, INC., Mountain View, CA (US)

( * ) Notice: Subject to any disclaimer, the term of this patent is extended or adjusted under 35 U.S.C. 154(b) by 244 days.

(21) Appl. No.: 17/331,051

(22) Filed: May 26, 2021

Related U.S. Application Data

(60) Provisional application No. 63/034,581, filed on Jun. 4, 2020.

(51) Int. Cl.
*G05D 1/02* (2020.01)
*G05D 1/00* (2006.01)

(52) U.S. Cl.
CPC ......... *G05D 1/0214* (2013.01); *G05D 1/0088* (2013.01); *G05D 1/0219* (2013.01); *G05D 1/0276* (2013.01); *G05D 2201/0213* (2013.01)

(58) Field of Classification Search
CPC .. G05D 1/0214; G05D 1/0088; G05D 1/0219; G05D 1/0276; G05D 2201/0213
See application file for complete search history.

(56) References Cited

U.S. PATENT DOCUMENTS

| | | | |
|---|---|---|---|
| 11,150,660 B1 * | 10/2021 | Kabirzadeh | G05D 1/0088 |
| 2019/0186936 A1 | 6/2019 | Ebner et al. | |
| 2019/0213103 A1 * | 7/2019 | Morley | G06F 11/3692 |
| 2019/0278290 A1 * | 9/2019 | Zhang | G01C 21/3848 |
| 2020/0286309 A1 | 9/2020 | Chellapilla et al. | |
| 2021/0096571 A1 * | 4/2021 | Modalavalasa | G06V 20/56 |
| 2021/0191404 A1 * | 6/2021 | Blake | G06V 20/58 |

OTHER PUBLICATIONS

Nidhi Kalra et al., "Driving to Safety—How Many Miles of Driving Would It Take to Demonstrate Autonomous Vehicle Reliability?", RAND Corporation, Transportation Research Part A: Policy and Practice, Dec. 1, 2016, vol. 94, 15 pages.

* cited by examiner

*Primary Examiner* — Anne Marie Antonucci
*Assistant Examiner* — Connor L Knight
(74) *Attorney, Agent, or Firm* — Edell, Shapiro & Finnan, LLC

(57) ABSTRACT

According to one aspect, a method is provided to determine whether an autonomous system is ready to be deployed or is otherwise ready for use, scene-based metrics, or metrics based on instances of scenarios. Scene-based metrics are mapped, or otherwise translated, to distance-based metrics such that substantially standard distance-based metrics may be used to gate the readiness of an autonomy system for deployment.

20 Claims, 12 Drawing Sheets

METHODS AND APPARATUS FOR USING SCENE-BASED METRICS TO GATE READINESS OF AUTONOMOUS SYSTEMS

CROSS-REFERENCE TO RELATED APPLICATION

This application claims priority under 35 U.S.C. § 119(e) to U.S. Provisional Patent Application Ser. No. 63/034,581, entitled "METHODS AND APPARATUS FOR USING SCENE-BASED METRICS TO GATE READINESS OF AUTONOMOUS SYSTEMS," filed on Jun. 4, 2020, which is hereby incorporated by reference in its entirety.

TECHNICAL FIELD

This disclosure relates to autonomous vehicles and/or autonomous systems, and more particularly to assessing autonomous vehicles.

BACKGROUND

As the use of autonomous or self-driving vehicles grows, the need to accurately assess autonomous systems used to control the vehicles is becoming increasingly important. When autonomous systems are inaccurately assessed, vehicles using the autonomous systems may pose safety issues.

Mile-based metrics or, more generally, distance-based metrics are typically used to gate, or verify, autonomy systems to determine when the autonomy systems are safe to deploy. For example, autonomy system disengagement metrics such a miles-per-critical-disengagement (MPCD) metric are often used to gate autonomy systems. While the use of distances driven as a metric to assess the readiness of an autonomy system for deployment may be effective, the use of distances driven as a metric does not account for variations in the complexity associated with navigating different distances.

DESCRIPTION OF EXAMPLE EMBODIMENTS

Overview

Figure 1:
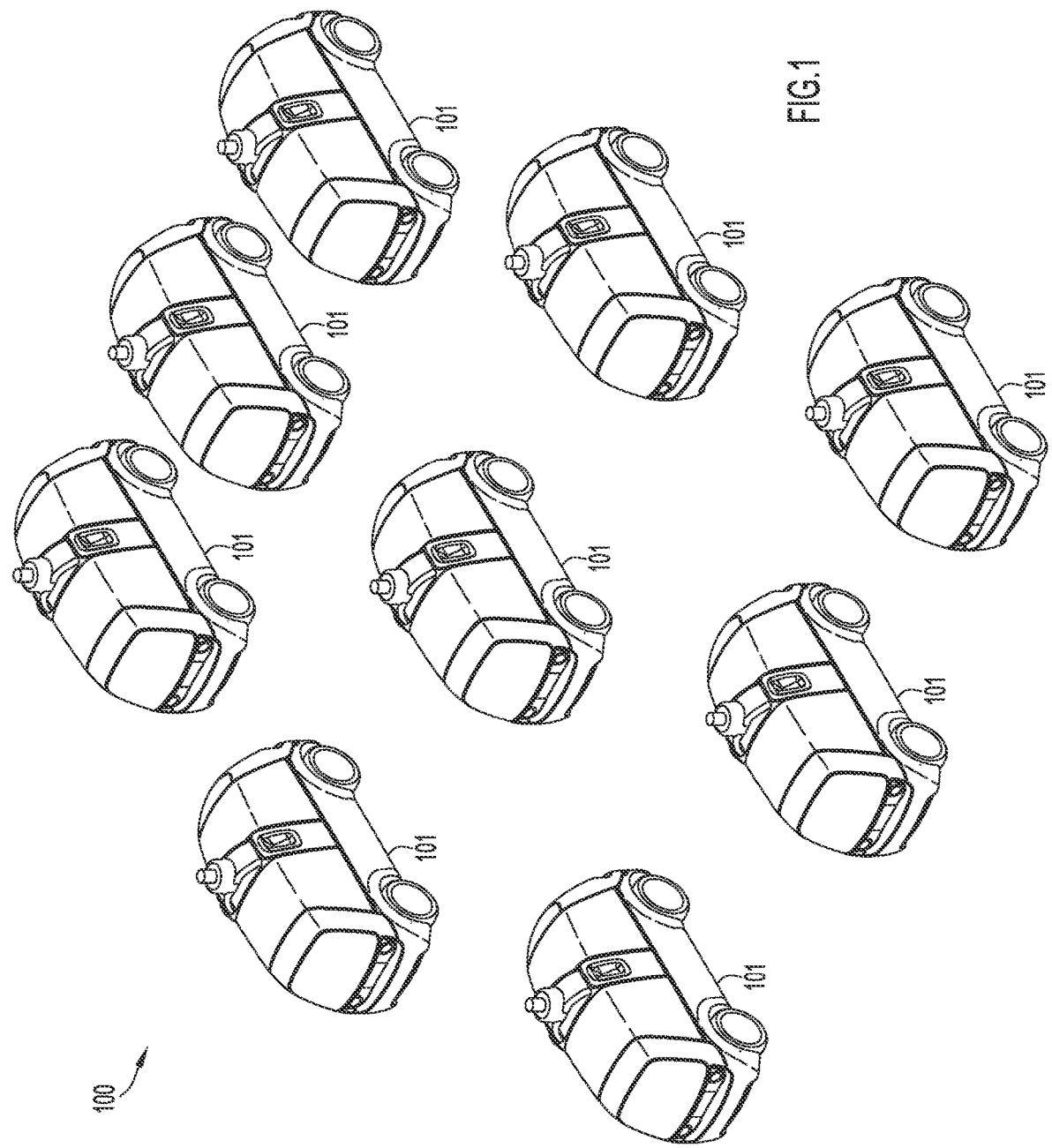
FIG. 1 is a diagram of an autonomous vehicle fleet in which scene-based metrics are used to assess whether an autonomous system is ready for deployment, according to an example embodiment.

Methods are provided to determine whether an autonomous system is ready to be deployed using scene-based metrics, or metrics based on instances of scenarios.

In one embodiment, these methods may involve a computing device obtaining a test data set that includes a plurality of scenario categories for a vehicle to encounter along a test path and a scene failure rate for each of the plurality of scenario categories and determining deployment scene-based metrics that include one or more of the plurality of scenario categories that are encountered by the vehicle in a deployment region. These methods may further involve mapping the deployment scene-based metrics to the test data set to determine the scene failure rate for each of the one or more of the plurality of scenario categories and determining whether an autonomous driving system meets a minimum deployment standard in the deployment region based on this mapping of the deployment scene-based metrics and based on a frequency of the one or more of the plurality of scenario categories in the deployment region.

In yet another embodiment, methods to determine whether the autonomous system is ready to be deployed may involve the scene-based metrics being mapped, or otherwise translated, to distance-based metrics such that substantially standard distance-based metrics may be used to gate the readiness of an autonomy system for deployment. An effective-MPCD metric may be obtained using scene-based metrics or scenarios. These methods may involve the computing device obtaining a data set representing an environment in which a vehicle is driven autonomously or under the control of an operator. The data set includes a plurality of scenario categories and a scene failure rate for each of the plurality of scenario categories. These methods may further involve mapping the data set to a distance-based metric to obtain the MPCD using scenes per unit distance and the scene failure rate and determining whether an autonomous driving system meets a minimum deployment standard based on the MPCD.

Example Embodiments

To assess the readiness of autonomy systems for deployment, e.g., in autonomous vehicles, metrics involving the number of miles driven are typically used. That is, distance-based metrics are often used to determine whether an autonomy system meets predetermine standards and is, hence, ready to be deployed.

The use of distance-based metrics, however, generally does not account for the quality of distances driven. In other words, distance-based metrics do not account for different driving scenarios. Some distances driven, or operational environments driven in, and may be less complicated that other distances driven. For example, one hundred miles driven on a straight highway in an unpopulated area would be less complicated than, or otherwise different from, one hundred miles driven on roads in a densely populated, urban area. In such a case, miles driven on the straight highway may be "easier" than miles driven on crowded urban roads. Thus, assessing the readiness of an autonomy system based substantially on distance-based metrics may result in an inaccurate determination of readiness.

Using scene-based metrics, or scenario-based metrics, to determine whether an autonomy system that includes autonomy software is ready for use increases the accuracy with which the autonomy system may be assessed for readiness. By way of example, if a more complicated scenario is given more weight in an assessment of readiness than a less complicated scenario, then an autonomy system may be assessed at least in part based on the quality of distances driven, Effectively mapping or translating scene-based metrics to distance-based metrics may allow substantially standard distance-based metrics to be used to gate the readiness of an autonomy system. Such a mapping or translation may allow for the calculation of effective miles per critical disengagement (MPCD) to be substantially calculated using scene-based metrics.

Using scene-based metrics may generally allow for a more robust process to gate or otherwise verify autonomy systems. Scene-based metrics essentially allow for an environment in which an autonomy system is being tested to be a factor when assessing readiness of the autonomy system. As such, miles driven by a vehicle on straight highways without any traffic around may be weighed differently from miles driven on crowded urban roads with cars flanking the vehicle.

Complexities of the deployment area for the autonomy system may be accounted for by mapping deployment scene-based metrics to a test data set that includes various possible scenario categories. Using the actual deployment environment, readiness of the autonomy system may be more accurately assessed. Further, scene-based metrics may be mapped or translated into distance-based metrics such that comparisons may effectively be made between scene-based metrics and known distance-based classifications.

Autonomy systems are often used to facilitate the operation of vehicle fleets. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system. Each autonomous vehicle 101 may be a manned or unmanned mobile machine configured to transport people, cargo, or other items.

Each autonomous vehicle 101 may be fully or partially autonomous such that the vehicle can travel in a controlled manner for a period of time without human intervention. For example, a vehicle may be "fully autonomous" if it is configured to be driven without any assistance from a human operator, whether within the vehicle or remote from the vehicle, while a vehicle may be "semi-autonomous" if it uses some level of human interaction in controlling the operation of the vehicle, whether through remote control by, or remote assistance from, a human operator, or local control/assistance within the vehicle by a human operator. A vehicle may be "non-autonomous" if it is driven by a human operator located within the vehicle. A "fully autonomous vehicle" may have no human occupant or it may have one or more human occupants that are not involved with the operation of the vehicle; they may simply be passengers in the vehicle.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
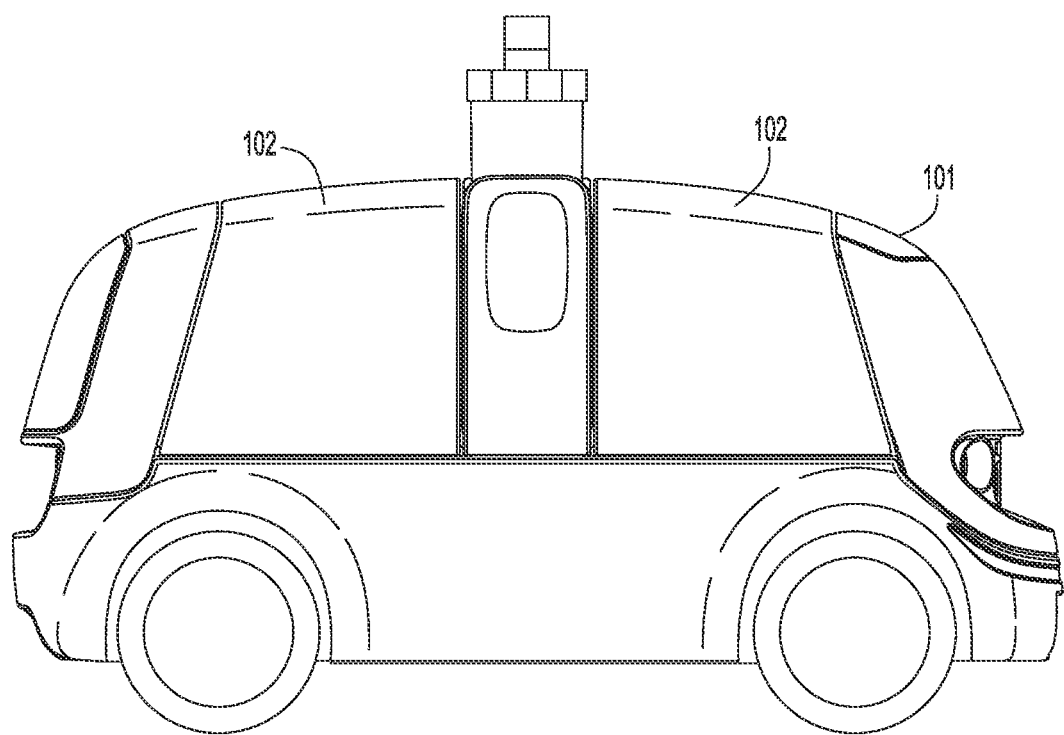
FIG. 2 is a diagram of a side of an autonomous vehicle which is assessed for deployment using scene-based metrics, according to an example embodiment.

FIG. 2 is a diagrammatic representation of a side of an autonomous vehicle, e.g., one of autonomous vehicles 101 of FIG. 1, according to an example embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

Autonomous vehicle 101 includes a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102.

Figure 3:
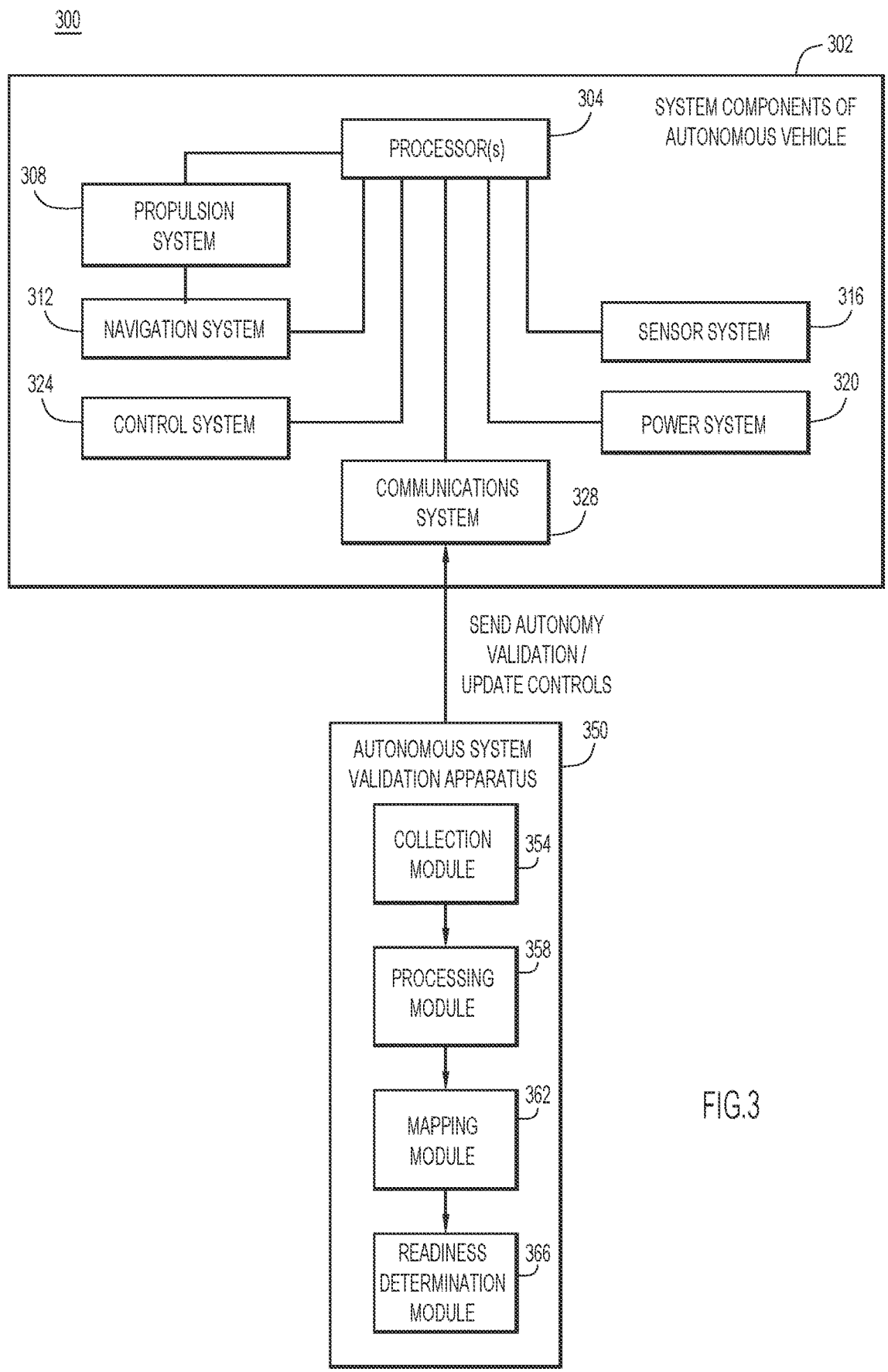
FIG. 3 is a block diagram of system components of an autonomous vehicle, according to an example embodiment.

FIG. 3 is a block diagram representation of a system 300 that includes the system components 302 of an autonomous vehicle, e.g., autonomous vehicle 101 of FIG. 1 and an autonomous system validation apparatus 350, in accordance with an embodiment.

The system components 302 of the autonomous vehicle 101 include a processor 304, a propulsion system 308, a navigation system 312, a sensor system 316, a power system 320, a control system 324, and a communications system 328. It should be appreciated that processor 304, propulsion system 308, navigation system 312, sensor system 316, power system 320, and communications system 328 are all coupled to a chassis or body of autonomous vehicle 101.

Processor 304 is arranged to send instructions to and to receive instructions from or for various components such as propulsion system 308, navigation system 312, sensor system 316, power system 320, and control system 324. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 316 to allow navigation system 312 to cause autonomous vehicle 101 to navigate through an environment.

Sensor system 316 includes any sensors, as for example LiDAR, radar, ultrasonic sensors, microphones, altimeters, and/or cameras. Sensor system 316 generally includes onboard sensors, which allow autonomous vehicle 101 to safely navigate, and to ascertain when there are objects near autonomous vehicle 101. In one embodiment, sensor system 316 may include propulsion systems sensors that monitor drive mechanism performance, drive train performance, and/or power system levels.

Power system 320 is arranged to provide power to autonomous vehicle 101. Power may be provided as electrical power, gas power, or any other suitable power, e.g., solar power or battery power. In one embodiment, power system 320 may include a main power source, and an auxiliary power source that may serve to power various components of autonomous vehicle 101 and/or to generally provide power to autonomous vehicle 101 when the main power source does not does not have the capacity to provide sufficient power.

Communications system 328 allows autonomous vehicle 101 to communicate, as for example, wirelessly, with a fleet management system (not shown) that allows autonomous vehicle 101 to be controlled remotely. Communications system 328 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand. The communications system 328 is further configured to communicate with the autonomous system validation apparatus 350. The communications system 328 may provide simulation data, described below, to the autonomous system validation apparatus 350 and/or receive autonomy validation and update controls. The autonomous system validation apparatus 350 may indicate that the autonomous driving system of the autonomous vehicle 101 is ready for deployment.

In some embodiments, control system 324 may cooperate with processor 304 to determine where autonomous vehicle 101 may safely travel, and to determine the presence of objects in a vicinity around autonomous vehicle 101 based on data, e.g., results, from sensor system 316. In other words, control system 324 may cooperate with processor 304 to effectively determine what autonomous vehicle 101 may do within its immediate surroundings. Control system 324 in cooperation with processor 304 may essentially control power system 320 and navigation system 312 as part of driving or conveying autonomous vehicle 101. Additionally, control system 324 may cooperate with processor 304 and communications system 328 to provide data to or obtain data from other autonomous vehicles 101, a management server, a global positioning server (GPS), a personal computer, a teleoperations system, a smartphone, the autonomous system validation apparatus 350, or any computing device via the communications system 328. In general, control system 324 may cooperate at least with processor 304, propulsion system 308, navigation system 312, sensor system 316, and power system 320 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 316, power system 320, and control system 324.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system.

The autonomous system validation apparatus 350 is configured to determine whether the autonomy system of the autonomous vehicle is ready for deployment and communicate the same to the communications system 328. The autonomous system validation apparatus 350 may communicate with other devices and entities. The autonomous system validation apparatus 350 includes a collection module 354, a processing module 358, a mapping module 362, and a readiness determination module 366, explained in detail with reference to FIG. 4. These modules may be software modules that are executed by a processor of the autonomous system validation apparatus 350.

When an autonomy system is evaluated for readiness for deployment, the autonomy system is often tested under controlled conditions e.g., with a driver in the vehicle prepared to take control of the vehicle. The use of scene-based metrics, in which scenes are instances of scenarios, to evaluate the readiness of an autonomy system increases the accuracy and/or robustness with which the autonomy system may be evaluated.

To evaluate an autonomy system, large-scale simulations are performed in which the vehicle may be virtually driven by the autonomy system for hundreds of thousands of miles and a number of events that occurred during the simulation is determined. For example, an event is an accident, a near miss, or other bad behavior such as running a red light. The events can be user-defined events and/or may be targeted for each particular simulation. Based on the number of miles (distance) and the number of events encountered, the MPCD or more appropriately, miles per collision (MPC) is determined. The terms MPCD and MPC are used interchangeably.

The autonomous system is ready for deployment when the MPC of the autonomy system is equal to or better than that of a human driver. For example, if an average human driver has a minor accident or a near miss every 20,000 miles (MPC) and a serious accident every 250,000 miles, the autonomous system would need to drive at least 250,000 miles to be ready for deployment. Further, if the statistical confidence level of the autonomous system is to be comparable to that of a human driver, the confidence level needs to be set at a sufficiently high percentage as appropriate for safety critical systems. To achieve this higher confidence level (reduced failure rate), the amount of miles (distance) that needs to be driven grows exponentially. Accordingly, it becomes impractical, if not impossible, to collect the data (number of miles) needed to prove readiness of the autonomous system for deployment with statistically high confidence level.

In one or more example embodiments, scene-based metrics are developed. Using the scene-based metrics, the amount of data needed is reduced while the autonomous system may be evaluated for deployment with a statistically higher confidence level. To obtain scene-based metrics, miles driven by the autonomy system are analyzed to determine frequency and type of events encountered along the way and the type of route that is being driven. That is, the miles driven are sliced into portions (scenes) and assessed separately. Events are instances or scenarios in which another vehicle, agent, or object may be encountered and may cause an accident or collision damage.

In one embodiment, scenes or scenarios may be defined as a combination of an Operational Design Domain (ODD) and an Object and Event Detection and Response (OEDR). A scenario may be a combination of parameters or parameter options, and may be of any suitable length defined in distance and/or time. An ODD may identify a static scene parameter such road type that is traversed by a vehicle or a robot, and an OEDR may characterize an intelligent, reactionary environment around the vehicle or robot, e.g., may characterize dynamic agents and events in the environment.

In one example, an ODD may indicate, but is not limited to indicating, whether a road has a protected intersection, has an unprotected intersection, and/or is a through street in a particular "slice" such as a mile slice. In such an example, an OEDR may indicate, but is not limited to indicate, the presence of pedestrians, the presence of vehicles with drivers in cross-traffic, the presence of vehicles with drivers in front of the vehicle, the presence of vehicles with drivers behind the vehicle, the presence of parked vehicles, and/or the presence of foreign objects such as debris.

A portion of the distance driven during test simulations may involve a dynamic region of interaction (DRI), which is a region in which events occur. Large fractions of the distance, however, is an empty road in which no obstacles or objects are encountered.

By slicing the distance driven into various scenes and categorizing various scenes into scenario categories, the distance needed to determine readiness for deployment of the autonomy system may be reduced and an accuracy of the assessment may be improved (to achieve a higher confidence level).

In related art, software engineers obtain a point of failure (accident event) and try to fix this failure. In other words, current solutions may be overfitting the problem as opposed to solving the underlying issue. In an example embodiment, using scene-based metrics, software engineers are provided with a scene type (scenario category) to address any issues therein as opposed to a particular point of failure, thereby increasing statistical confidence. Further, more data for a particular scenario category may be collected to increase statistical confidence. Additionally, the frequency of an occurrence of a particular scenario category is considered. For example, if the scenario category occurs rarely (at a low frequency), it may be acceptable to have failures therein because the frequency of this failure is within an acceptable margin e.g., still better than that of a human driver.

In one or more example embodiments, readiness of an autonomy system may be gated based on parameters such as MPCD, as well as an expected probability of criticals, e.g., critical events, in known exposure. A determination of how a number of criticals that is considered acceptable may be calculated, in one embodiment, as a Poisson distribution.

FIGS. 4, 5, and 7-11 are flow charts illustrating various processes involved in determining readiness for deployment of an autonomy system, according to one or more example embodiments. These processes may be executed by one or more computing devices such as the autonomous system validation apparatus 350 of FIG. 3.

Figure 4:
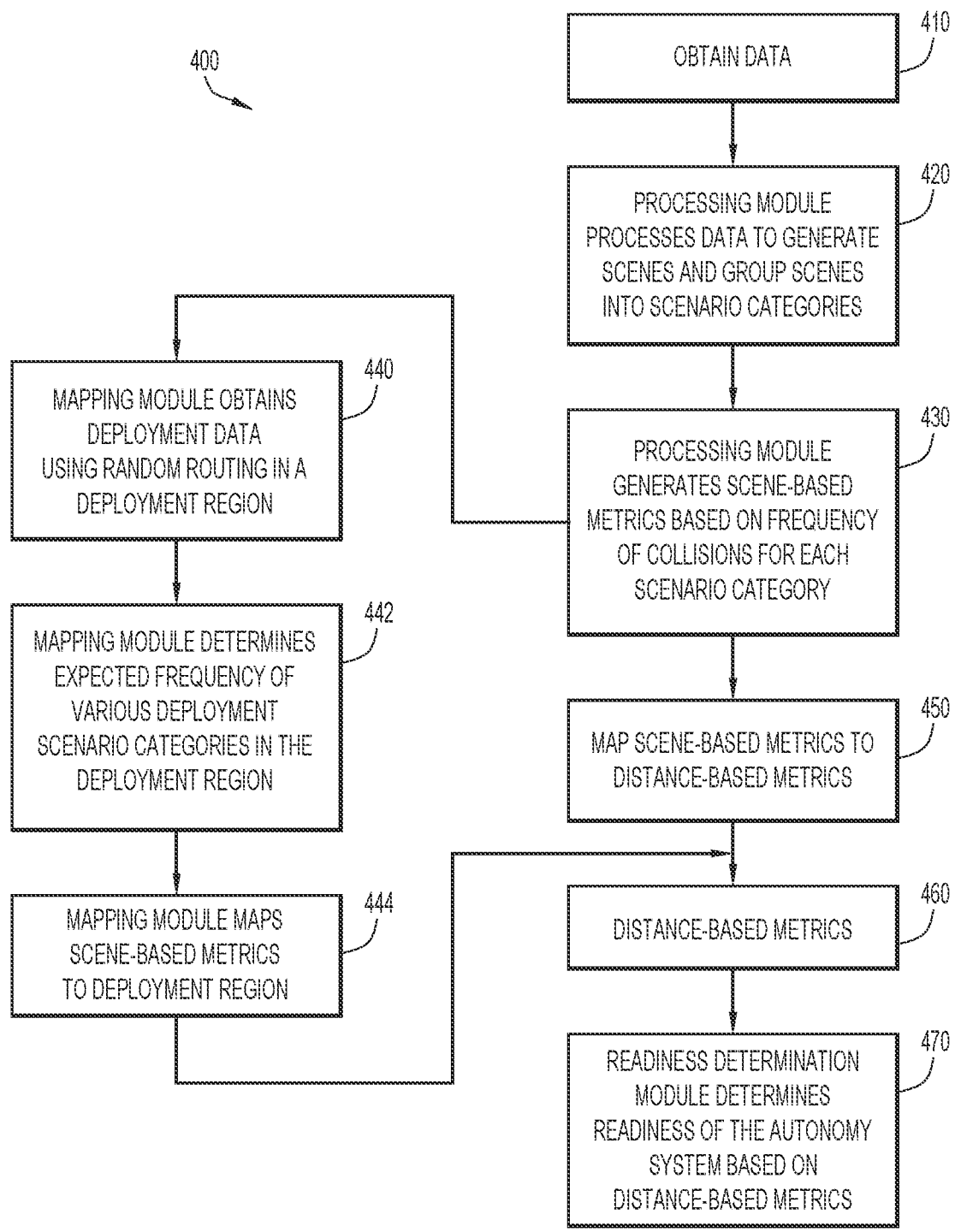
FIG. 4 is a flow chart of a process for determining the readiness of an autonomy system, according to various example embodiments.

Reference is now made to FIG. 4, with continued reference to FIG. 3, which illustrates a flow chart of a process 400 for determining the readiness of an autonomy system, according to one or more example embodiments. The process 400 is implemented using various software modules executed by the autonomous system validation apparatus 350 of FIG. 3, that is, the collection module 354, processing module 358, mapping module 362, and readiness determination module 366.

The process 400 of determining the readiness of an autonomy system begins at 410, in which the collection module 354 processor obtains data. Data may generally be collected from a vehicle as the vehicle drives, e.g., by an autonomy system as the autonomy system is tested in various controlled environments. Data may be collected as the autonomy system of the vehicle is tested in real-world environments with a human operator ready to take control of the vehicle if needed, e.g., if the autonomy system disengages or the vehicle suffers a system fault. In one embodiment, the data may be collected and stored in a memory on the vehicle, and then subsequently uploaded to a server and/or a database for processing.

Data may generally include data collected using any suitable sensor on the vehicle. It should be appreciated that data may also include any data obtained in the event that the vehicle is operated using teleoperations, and/or data associated with failovers after system faults such as software and/or hardware faults.

Data obtained at 410 may involve multiple simulations and is defined as a test data set obtained based on random routing in one or more simulations and/or real driving environments.

At 420, the processing module 358 processes the data to generate scenes and group scenes into scenario categories. In one embodiment, the processing module 358 reduces or otherwise processes test data set to generate scenario categories based on various scenes in the environment in which the vehicle is operating.

Specifically, the processing module 358 analyzes all the miles of the test data set, calculates all events (e.g., collisions) that were encountered in these miles, and slices and dices all of these miles into scenes. For every scene, the ODD of that scene is determined. For example, the ODD is: (a) an intersection where the autonomy system always has a right-of-way, (b) an intersection where the autonomy system never has a right-of-way, (c) an intersection where the autonomy system has a right-of-way based on first arrival, or (d) an intersection where the autonomy system has a right-of-way based on a traffic light.

Next, for each scene, the processing module 358 identifies the OEDR that involves one or more agents in the DRI of the autonomy system. An agent in the DRI is identified as a function of the velocity of the autonomy system and of the agent and the distance between the two. If the agent needed to take any action or maneuver such as to break or swerve, to avoid interacting with the autonomy system, this agent is identified to be within the DRI.

Based on a combination of ODD and OEDR, each scene is allocated to a respective scenario category. The scenario category is a unique combination of ODD and OEDR.

At 430, the processing module 358 generates scene-based metrics based on frequency of collisions for each scenario category i.e., MPCD per scenario category. The frequency of collisions is calculated as a function of the number of scenes (distance in miles) for each scenario category and number of failures that occurred for these scenes.

In one embodiment in which a deployment region for the autonomy system is known, at operation 440, similar to operation 410, the mapping module 362 obtains deployment data using random routing in a deployment region. At 442, similar to the operation 420, the mapping module 362 determines an expected frequency of various scenario categories in the deployment region by slicing the deployment data into various scenes and then grouping the scenes into respective scenario categories.

At 444, the mapping module 362 maps a frequency of collision (failure rate—MPCD) of the scene-based metrics to the deployment region based on the expected frequency of various scenario categories in the deployment region obtained at 442. As a result, a MPCD for the deployment region is obtained without additional random routing in the deployment region and without calculating a frequency of collision in the deployment region. Instead, the frequency of collision of the test data set is mapped to the deployment region based on an expected frequency of various scenario categories in the deployment region.

In another embodiment in which the deployment region may not yet be known, at 450, the mapping module 362 maps scene-based metrics of the test data directly to distance-based metrics. Specifically, the mapping module 362 is configured to map the MPCD per scenario category to a distance metric. The mapping module 362 maps, translates, or transforms the scene-based metrics into distance-based metrics, or substantially standard metrics that may be used to evaluate whether an autonomy system meets deployment standards, e.g., minimum deployment standards. In general, the mapping module 362 utilizes information relating to scenes to create a mapping or a translation, which effectively generates distance-based metrics from scene-based metrics.

At 460, the mapping module 362 obtains distance-based metrics. In one embodiment, the mapping module 362 obtains distance-based metrics based on a frequency of occurrence of various scenario categories of the deployment region obtained at 442, their respective collision rates, and distances based on the scene-based metrics obtained at 444. In another embodiment, the mapping module 362 obtains distances of various scenario categories and their respective collision rates obtained at 450. The mapping module 362 adds a buffer distance to obtain the distance-based metrics or the MPCD. The buffer distance involves miles or portions of the route that are empty and do not involve any ODDs and/or OEDRs.

The distance-based metrics are then provided to the readiness determination module 366. At 470, the readiness determination module 366 evaluates the distance-based metrics to determine whether the autonomy system is ready to deploy safely, or otherwise meets minimum readiness or deployment standards. Readiness or deployment standards may include, but are not limited to including, standards relating to whether distance-based metrics indicate that an average MPCD metric or MPC metric meets at least a threshold number.

In one example embodiment, an evaluation or verification of an autonomy system may include testing the autonomy system to substantially determine when the autonomy system is within an acceptable residual risk on a per scenario category basis. Each scenario or scene may be treated as an independent trial, e.g., an independent Bernoulli trial such that substantially any scenario has an unknown failure that follows a Binomial Distribution. In general, a scenario category may be an ODD-OEDR combination within a predefined scope, e.g., a static ODD-OEDR combination. A scene may be an instance of a scenario category, or an instantiation of a scenario, and may have some variability within a given ODD-OEDR combination. That is, each scenario category may effectively be a substantially unique combination of ODDs and OEDRs. As will be appreciated by those skilled in the art, routes or zones may typically be partitioned into scenarios and/or scenes. In one embodiment, an effective MPCD may be calculated or otherwise determined for substantially any route based at least in part on a failure rate of constituent scenarios and/or a number of scenes within each route.

Figure 5:
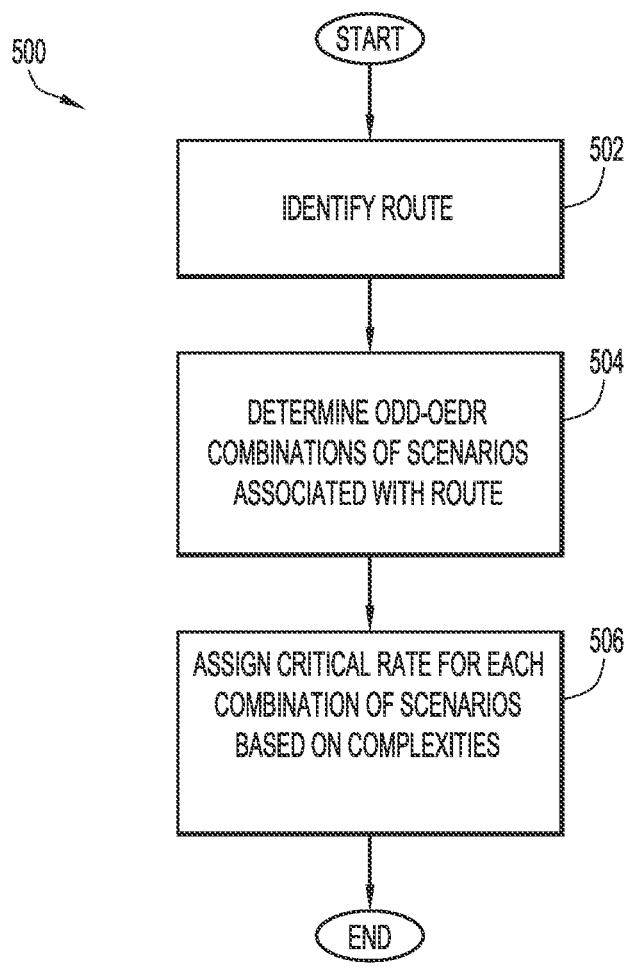
FIG. 5 is a flow chart illustrating a method of characterizing different scenarios or scenes in a route, according to an example embodiment.

FIG. 5 is a flowchart illustrating a method 500 of characterizing different scenarios or scenes in a route, according to an example embodiment. The method 500 begins at 502 in which the autonomous system validation apparatus 350 of FIG. 3 identifies a route. The route may be any suitable route, and may be of substantially any length or distance. A route may include different complexities, e.g., may include crowded urban roads in densely populated areas and straight highways in relatively rural areas.

At 504, ODD-OEDR combinations of scenarios or scenes included in the route are determined and otherwise identified. Scenarios may be identified based on distance, length of time expected to traverse each scenario, and/or complexity. Generally, a route may include any number of scenarios. Once ODD-OEDR combinations of scenarios are identified, a critical rate (frequency of collision or failure rate) is assigned for each combination of scenarios (scenario category) at 506 based, at least in part, on complexities. The method 500 of characterizing different scenarios is completed after critical rates are assigned. The method 500 generates scenario categories and their respective critical rate.

In one embodiment, scenes in an overall route may essentially have the same length in terms of time. By way of example, each scene may effectively be approximately fifteen seconds long. To achieve substantially the same length for each scene in an overall route, scenes may be sliced into ground distances of substantially equal length in order to increase the likelihood that the behavior of agents within the scene may be influenced by the presence of others within the scene. The approximate length of each scene may vary widely, and may be selected based upon, but is not limited to be selected based upon, the length that is likely to be needed to substantially ensure that the behavior of agents may be influenced by the presence of others.

Figure 6:
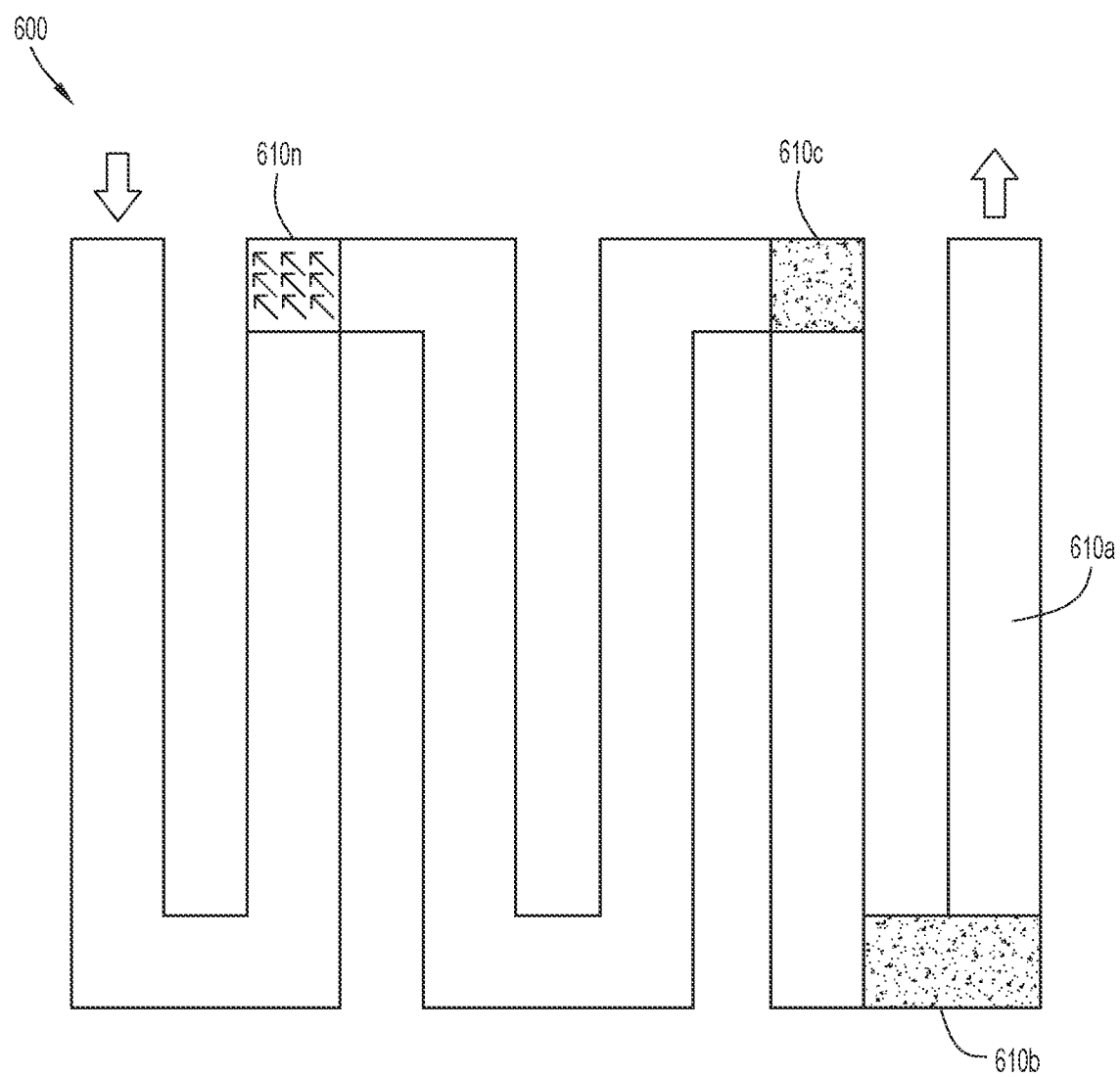
FIG. 6 is a diagram of a route with different scenes or scenarios, according to an example embodiment.

With continued reference to FIG. 5 bot now also with reference to FIG. 6, a diagram of a route 600 with different scenes or scenarios, is described according to an example embodiment. At 502, the route 600 is identified and includes scenes 610a-n. The notation "a-n" denotes that a number of scenes is not limited, can vary widely, and depends on a particular use case scenario and route. This is but one example of the route 600 and number of scenarios and types would vary widely based on a particular deployment region and use case scenario.

At 504, various scenario categories encountered along the route 600 are determined. Metrics may be determined for each of the scenes 610a-n, and each metric may be indicative of the complexity of an associated scene. For example, the first scene 610a has more distance than second scene 610b, which has more distance than third scene 610c and fourth scene 610n. The first scene 610a is an empty road with no ODD and OEDRs. The remaining scenes 610b-n have a combination of ODD and OEDR and fall into one of the scenario categories. The second scene 610b and the third scene 610c have the same shading indicating that they have the same complexity e.g., the same scenario category such as a lead vehicle and a tailgater vehicle. The fourth scene 610n has a different shading indicating a different complexity, such as a pedestrian.

Various critical rates (scene failure rates) may be assumed or assigned at 506, e.g., one failure in a million or one failure in one hundred thousand for the scenes, an average failure rate may be determined based on a number of scenes per unit distance (mile). The failure rates may be mapped into MPCD (MPC), which may be validated by testing scenes repetitively.

In one example embodiment, the average failure rate for each scenario category is obtained based on the scene-based metrics from previous simulations. By using scene-based metrics and obtaining a representation of various scenes and their frequency in the deployment region, the MPC of the route 600 is obtained without actually driving the route 600. Further, to increase the level of confidence, the autonomy system may be repetitively tested for various scene categories of 610b-n while omitting scene 610a, thereby also reducing simulation time or distance driven.

In many instances, assuming a particular scene distance or length and a particular velocity of a vehicle, an overall distance tested, e.g., miles of testing, may be determined. The use of scenes for testing enables an MPCD to be validated in a more directed approach than a standard distance-based approach. Generally, given an overall distance driven and a time spent in a particular scene, a mapping may be performed to obtain distance-based metrics such that an MPCD may be determined.

For any effective MPCD, and given a substantially known route in miles, a Poisson process may be assumed with an approximate failure rate given as:

$$\frac{1}{MPCD}$$

to determine a probability of criticals for the exposure of a route. The probability of criticals may be evaluated to determine whether the deployment of an autonomy system may be considered to be safe, i.e., whether the autonomy system is ready for deployment. In one embodiment, a probability of criticals for a given MPCD may effectively be an average number of criticals over a particular distance.

Figure 7:
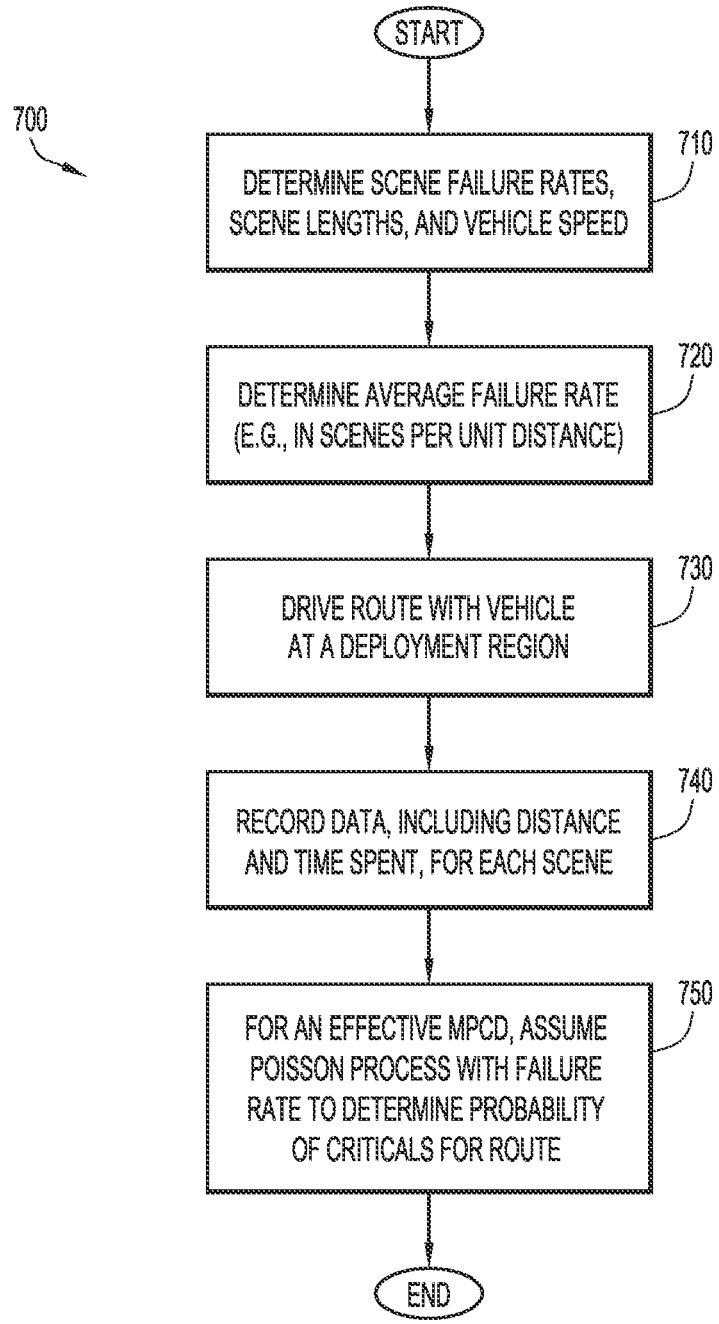
FIG. 7 is a flow chart illustrating a method of performing a scene-based evaluation of an autonomy system, according to an example embodiment.

FIG. 7 is a flowchart illustrating a method 700 of performing a scene-based evaluation of an autonomy system, according to an example embodiment. With continued reference to FIG. 6, the method 700 begins at 710 in which scene failure rates and scene lengths associated with an overall route, as well as vehicle speed, are determined. The overall route may include various simulations in various regions that are divided into various scenes such as the scenes 610a-n, and corresponding scene failure rates and scene lengths may be determined in addition to a vehicle speed.

At 720, an average failure rate is determined. The average failure rate may be, in one embodiment, substantially based on scenes per unit distance. Based on 710 and 720, test data set is obtained. At 730, the vehicle is driven on the route 600 such that an autonomy system onboard the vehicle may be tested e.g., to determine frequency of various scenario categories in a deployment region. Data is recorded, including a distance and time spent navigating each scene, at 740.

A probability of criticals for the route in the deployment region is determined at 750 (collisions per distance). To determine the probability of criticals, for an effective MPCD, a Poisson process with a failure rate may be assumed. In other words, a probability of criticals for the exposure of the route identified at 710 is determined. Once the probability of criticals is determined, the method 700 of performing a scene-based evaluation of an autonomy system is completed.

Figure 8:
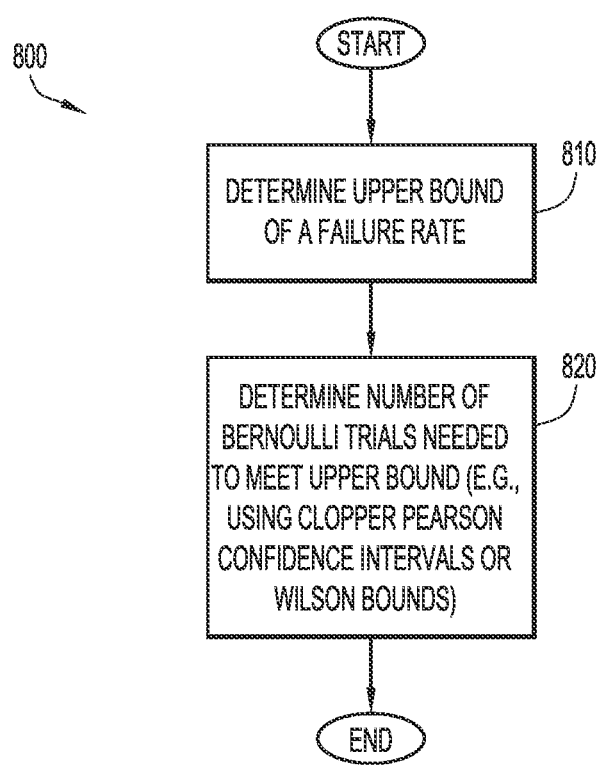
FIG. 8 is a flow chart illustrating a method of determining a number of scenes to use in an evaluation, according to an example embodiment.

FIG. 8 is a flow chart depicting a method 800 of determining a number of scenes to use in an evaluation of an autonomy system, in accordance with an example embodiment. The method 800 of determining a number of scenes to use in evaluating the readiness of an autonomy system begins at 810, in which an upper bound of a failure rate is determined. At 820, if is determined how many Bernoulli trials may be needed to effectively meet the upper bound. In one embodiment, such a determination involves identifying a substantially maximum number of Bernoulli trials needed for up to a particular number of failures or criticals, e.g., an observed number of failures or criticals. It should be appreciated that a calculation may be made as to a number of Bernoulli trials that may be needed to effectively claim the upper bound. Such a calculation may be made using any suitable method including, but not limited to including, a Clopper-Pearson interval method and Wilson method, which utilizes Laplace's Rule of Succession. Once the number of Bernoulli trials is determined, the method of determining a number of scenes to use is completed.

As will be appreciated by those skilled in the art, a Clopper-Pearson interval method is used to calculate binomial confidence intervals based directly on a binomial distribution and not on an approximation of a binomial distribution. In one embodiment, Clopper-Pearson intervals may be modified for reliability analysis. From a cumulative binomial distribution, the probability or confidence of success, with "k" failures in "N" scenes of testing, where k is less than or equal to N, and for a failure rate "p" may be defined as S(k; n,p)=1−F(k; n,p) where:

$$F(k; n, p) = Pr(X \le k) = \sum_{i=0}^{\lfloor k \rfloor} \binom{n}{i} p^i (1-p)^{n-i}$$

where $\lfloor k \rfloor$ is the "floor" under k, i.e. the greatest integer less than or equal to k and where $$\binom{n}{k} = \frac{n!}{k!(n-k)!}$$

Using a Clopper-Pearson interval method, a tradeoff between a generalization error and confidence level may be numerically evaluated. An initial estimate of the generalization error may be determined to be a function of N and k. It should be understood that a lower bound on a failure rate for a Clopper-Pearson interval method is typically zero.

A Wilson method estimates that a failure rate falls between an upper bound and a lower bound. In one embodiment, a desired confidence level "λ," a number of tests "N," a number of successes observed "S" and a number of failures "F", may be used to obtain a corresponding failure rate estimate as follows:

$$\frac{S+\lambda^2/2}{n+\lambda^2} - \lambda\frac{\sqrt{SF/n+\lambda^2/4}}{n+\lambda^2} \text{ and } \frac{S+\lambda^2/2}{n+\lambda^2} + \lambda\frac{\sqrt{SF/n+\lambda^2/4}}{n+\lambda^2},$$

where "n" is equivalent to "N."

While any suitable method may be used to estimate a MPCD, it has been observed that a Wilson method may be more conservative than a Clopper-Pearson interval method, and that a Wilson method may provide an upper bound to a MPCD.

Figure 9:
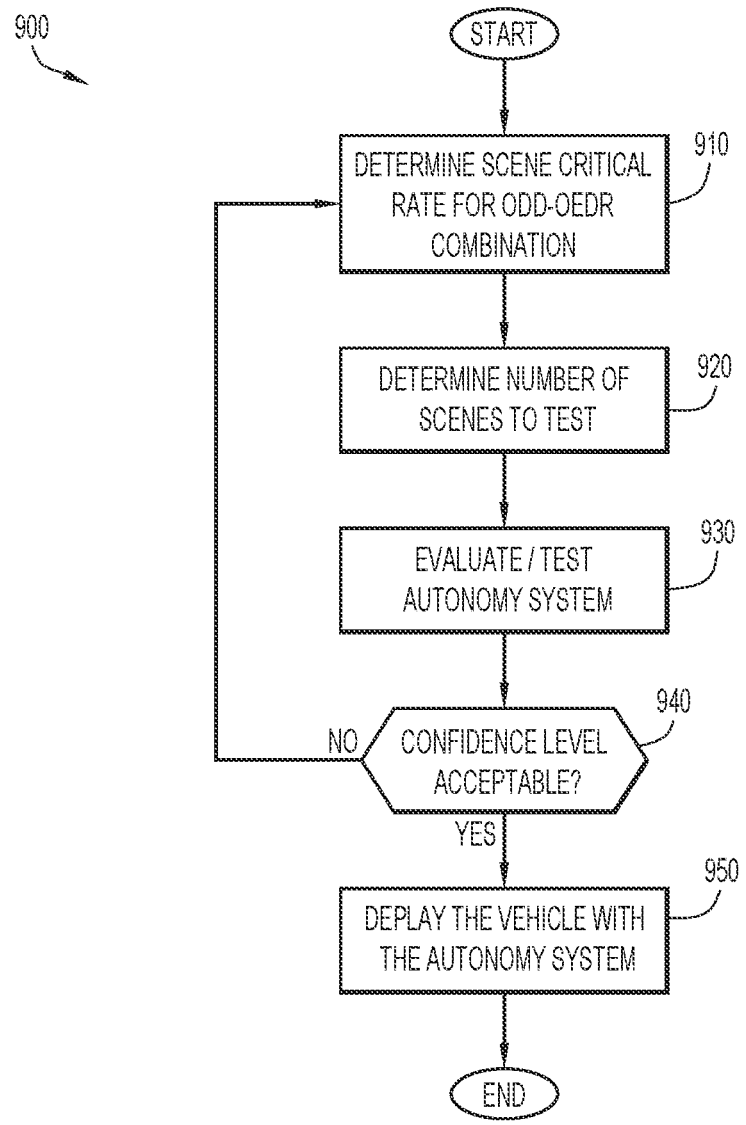
FIG. 9 is a flow chart illustrating a method of assessing parameters used to evaluate an autonomy system, according to an example embodiment.

FIG. 9 is a process flow diagram for a method 900 of assessing parameters used to evaluate an autonomy system in accordance with an example embodiment. In general, parameters may be determined using any suitable method. Suitable methods include, but are not limited to including, analyzing previously collected data to determine parameters, executing algorithms designed to predict parameters, which would provide a desired safety level, and/or analyzing appropriate guidelines and selected parameters based on the guidelines. As will be appreciated by those skilled in the art, trade-offs may be made between different parameters.

In one example embodiment, the parameters include a desired confidence level "λ," a number of tests "N," a number of successes observed "S", and a number of failures "F" that are traded to obtain the desired safety level.

The method 900 involves assessing parameters used to evaluate an autonomy system arranged to allow a vehicle to operate autonomously begins at 910, in which a scene critical rate for each scenario category (ODD-OEDR combination) is determined. Such a determination may be made, in one embodiment, using information relating to the state of the autonomy system on a vehicle, information relating to the state of a teleoperations system that is used to control the vehicle when needed, and/or information relating to a combination of the autonomy system and the teleoperations system.

At 920, a number of scenes to test is determined. Such a number may be selected based on, but is not limited to being based on, tractability. It should be appreciated that, in general, as a number of scenes tested increases, the number of failures which are allowed during scene testing may increase.

At 930, the autonomy system is evaluated or otherwise tested. That is, a confidence level is determined based on the scene critical rate for each scenario category (ODD-OEDR combination), as well as the number of scenes tested. At 940, a determination is made whether the determined confidence level is acceptable. Specifically, it is determined whether the scene critical rate for each scenario category (ODD-OEDR combination), as well as the number of scenes to test, is sufficient to provide an acceptable confidence level that an autonomy system is ready to be deployed.

If the determination at 940, is that the confidence level is acceptable, then the method 900 proceeds to 950, in which the vehicle with the tested autonomy system is deployed. Once the autonomy system is tested, the method 900 of assessing parameters used to evaluate an autonomy system is completed and the vehicle with the autonomy system may be deployed.

Alternatively, if it is determined at 940, that the confidence level is not acceptable, the indication is that some of the parameters used to assess the autonomy system are to be reconsidered. For example, acceptable confidence level "λ" may be lowered, a number of tests "N" may be increased, and/or a number of tests for a particular scenario category may be increased. The method returns from 940 to 910 in which the scene critical rate for each scenario category (ODD-OEDR combination) is re-determined based on modified parameters such as λ and/or N.

In general, a number of tests run and/or a number of different scenes tested may be increased to meet a desired confidence level, or probability level. In one embodiment, a substantially required test time in which "r" failures occur may be computed with a confidence "a" using a chi-square distribution as follows:

testTime=$\chi^2(\alpha,2r+3)$*MTBF/2 where MTBF is a mean time between failures.

Although only a few embodiments have been described in this disclosure, it should be understood that the disclosure may be embodied in many other specific forms without departing from the spirit or the scope of the present disclosure. By way of example, different levels of granularity may be needed for various ODD-OEDR combinations based, at least in art, on variance in the complexities of the combinations. Increasing granularity may allow an overall total distances driven to evaluate autonomy systems to be decreased.

It should be appreciated that the number of scenes tested with respect to an autonomy system may vary widely. A number of scenes may be tested in a substantially targeted way, while keeping the testing mileage substantially the same. In one embodiment, scenes may specifically test autonomy weak points and/or collision scenarios. The weak points and collision or crash scenarios may be obtained from any suitable source including, but not limited to, research and reports provided by the National Highway Traffic Safety Administration (NHTSA). In other words, test data set may include a larger frequency of a complex scenario category where possibility of collision or crash is higher rather than a less complex scenario category.

In one embodiment, the DRI, described above, may be substantially defined as a two-dimensional shape, e.g., a rectangle, around a vehicle that is aligned with a direction of velocity of the vehicle. The shape may effectively define a zone or a region within which either the vehicle or other agents, e.g., other vehicles or pedestrians, are to control steering and/or braking in a non-negligible manner due to relative proximity. The overall dimensions of the shape may be a function of, but are not limited to being a function of, the velocity of the vehicle and the velocities of other agents, and the types of agents. In general, a distance in front of a vehicle may be substantially assumed to provide enough stopping distance to avoid contact with another agent if the vehicle brakes mildly. A distance behind a vehicle, e.g., if the vehicle is reversing, may be substantially the same as the distance in front of the vehicle. The distance in front of the vehicle may also be substantially assumed to provide enough stopping distance to avoid stationary or static vehicles if the vehicle brakes mildly. A distance behind a vehicle, e.g., if the vehicle is reversing, may be substantially the same as the distance in front of the vehicle. It should be appreciated that cross-traffic, on-coming traffic, and/or vehicles in front of the vehicle or tailgating the vehicle, may also be evaluated to determine the dimensions of the shape.

In one embodiment, because an autonomy system may operate a vehicle at times and a teleoperations system may operate the vehicle at other times, responsibilities may be split scene-wise. For example, a first scene associated with a route may be navigated using an autonomy system while a second scene associated with the route may be navigated using a teleoperations system. Total scene-based metrics may be computed while accounting for scenes navigated using an autonomy system and scenes navigated using a teleoperations system.

Figure 10:
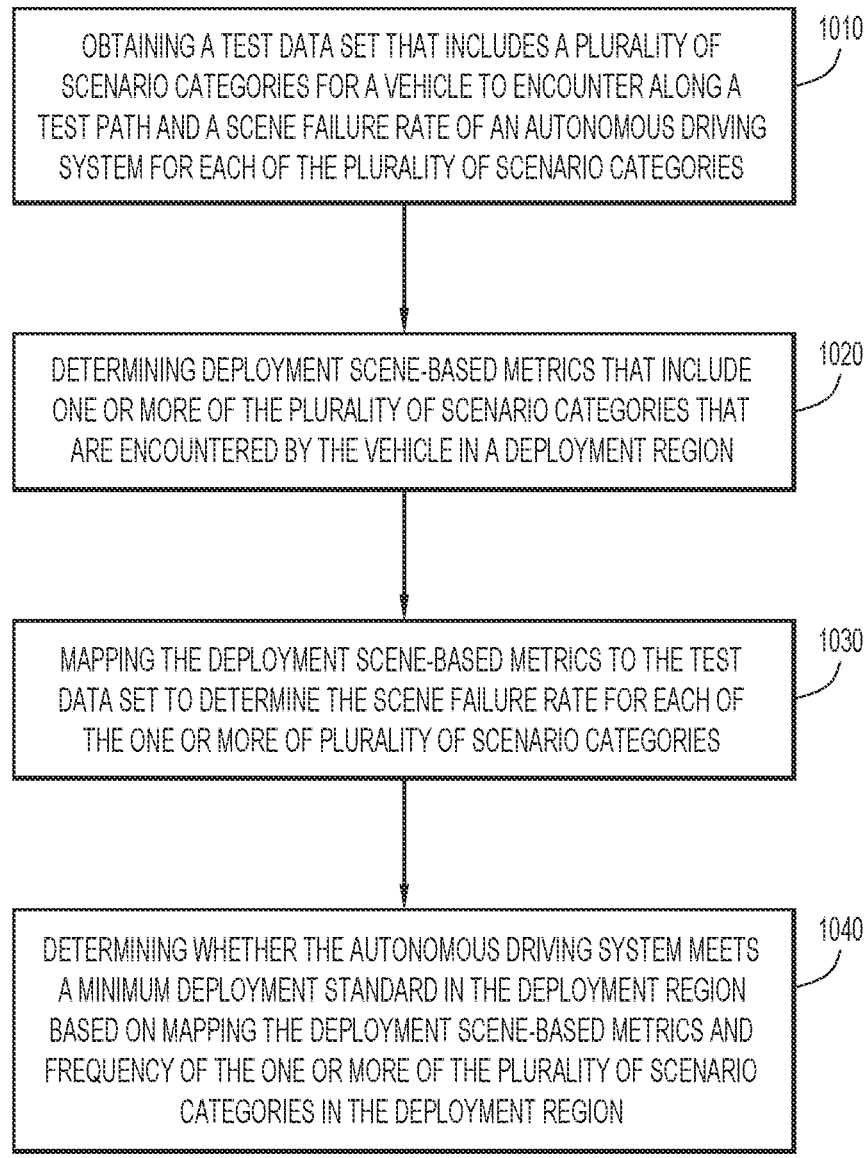
FIG. 10 is a flow chart depicting, at a high-level, operations of determining whether an autonomous driving system meets a minimum deployment standard in a deployment region, according to one example embodiment.

Reference is now made to FIG. 10 that shows a flow chart depicting a method 1000 of determining whether an autonomous driving system meets a minimum deployment standard in the deployment region, according to an example embodiment. The method 1000 may be performed by the autonomous system validation apparatus 350 of FIG. 3.

At 1010, the method 1000 involves a computing device obtaining a test data set that includes a plurality of scenario categories for a vehicle to encounter along a test path and a scene failure rate of an autonomous driving system for each of the plurality of scenario categories. At 1020, the method 1000 includes the computing device determining deployment scene-based metrics that include one or more of the plurality of scenario categories that are encountered by the vehicle in a deployment region. At 1030, the method 1000 involves the computing device mapping the deployment scene-based metrics to the test data set to determine the scene failure rate for each of the one or more of plurality of scenario categories and at 1040, the computing device determining whether the autonomous driving system meets a minimum deployment standard in the deployment region based on mapping the deployment scene-based metrics and frequency of the one or more of the plurality of scenario categories in the deployment region.

In one form, the method 1000 may further involve deploying an autonomous vehicle that uses the autonomous driving system based on determining that the autonomous driving system meets the minimum deployment standard.

Moreover, the method 1000 may further include generating the plurality of scenario categories, each of which is a combination of operation design domain (ODD) parameters and object and event detection response (OEDR) parameters.

In one instance, the operation 1040 of the computing device determining whether the autonomous driving system meets the minimum deployment standard may include calculating an average failure rate for an overall distance in the deployment region that includes scenes of the deployment region in which no objects or events are encountered along the path and determining whether the average failure rate meets the minimum deployment standard.

In one instance, the average failure rate may be presented in a form of a miles per critical disengagement (MPCD).

In one or more example embodiments, the plurality of scenario categories may be different from one another and vary in at least complexity, length, encountered agents, or vehicle speed.

Similarly, the test data set may include a larger frequency of a complex scenario category than a frequency of a less complex scenario category.

Moreover, in another form, the method 1000 may further involve generating an average failure rate in a distance-based metric based on the scene failure rate for each of the one or more of the plurality of scenario categories and the frequency of the one or more of the plurality of scenario categories.

Figure 11:
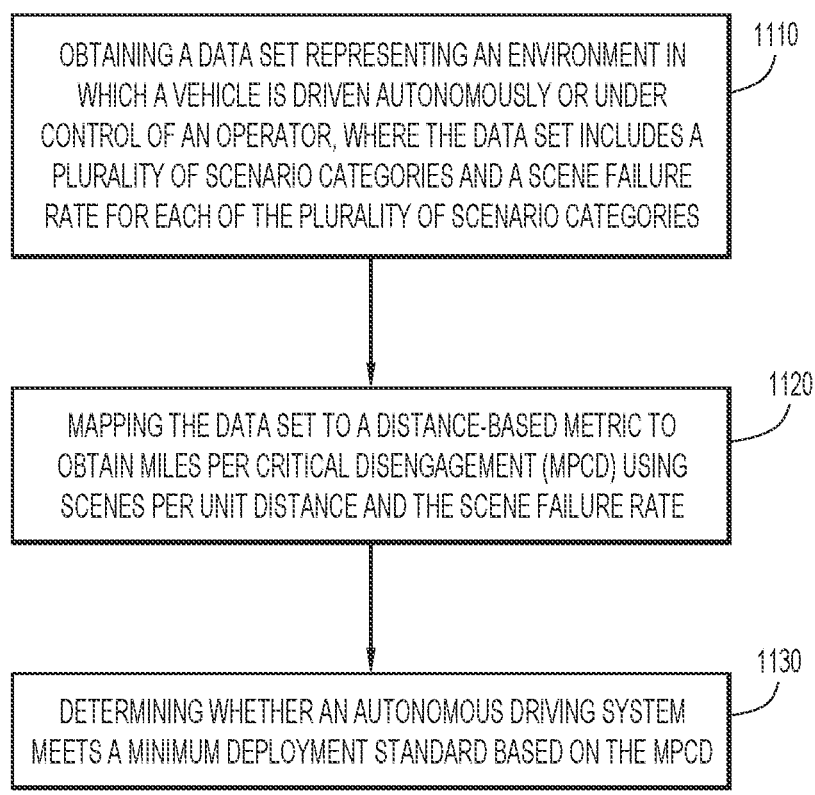
FIG. 11 is a flow chart depicting, at a high-level, operations of determining whether an autonomous driving system meets a minimum deployment standard based on MPCD, according to another example embodiment.

Reference is now made to FIG. 11 that shows a flow chart depicting a method 1100 of determining whether an autonomous driving system meets a minimum deployment standard based on MPCD, according to another example embodiment. The method 1100 may be performed by the autonomous system validation apparatus 350.

At 1110, the method 1100 involves a computing device obtaining a data set representing an environment in which a vehicle is driven autonomously or under control of an operator. The data set includes a plurality of scenario categories and a scene failure rate for each of the plurality of scenario categories. At 1120, the method 1100 involves the computing device mapping the data set to a distance-based metric to obtain miles per critical disengagement (MPCD) using scenes per unit distance and the scene failure rate and at 1130, the computing device determining whether an autonomous driving system meets a minimum deployment standard based on the MPCD.

In one form, the method 1100 may further involve deploying an autonomous vehicle having the autonomous driving system based on determining that the autonomous driving system meets the minimum deployment standard.

According to one or more example embodiments, the method 1100 may further involve generating the plurality of scenario categories, each of which is a combination of operation design domain (ODD) parameters and object and event detection response (OEDR) parameters.

In one instance, the plurality of scenario categories vary in length by at least one of distance or time. The operation of generating the plurality of scenario categories may further include assigning the scene failure rate for each of the plurality of scenario categories based on state information of one or more of the autonomous driving system, a teleoperation system, or a combination of the autonomous driving system and the teleoperation system.

Moreover, the ODD parameters are static scene parameters that may include road type and the OEDR is a reactionary environment in a dynamic region of interaction (DRI) of the vehicle and may include at least one of a dynamic agent or a reactionary event.

Further, the operation 1130 of determining whether the autonomous driving system meets the minimum deployment standard may include determining whether a confidence level of the autonomous driving system is acceptable based on the scene failure rate for each of the plurality of scenario categories and a number of scenes to test for each of the plurality of scenario categories.

According to one or more example embodiments, the method 1100 may further involve, based on determining that the confidence level is not acceptable, varying at least one of the scene failure rate for each of the plurality of scenario categories or the number of the scenes to use, to increase the confidence level for meeting the minimum deployment standard.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle, as described above with respect to FIG. 3, may include hardware, firmware, and/or software embodied on a tangible medium. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Figure 12:
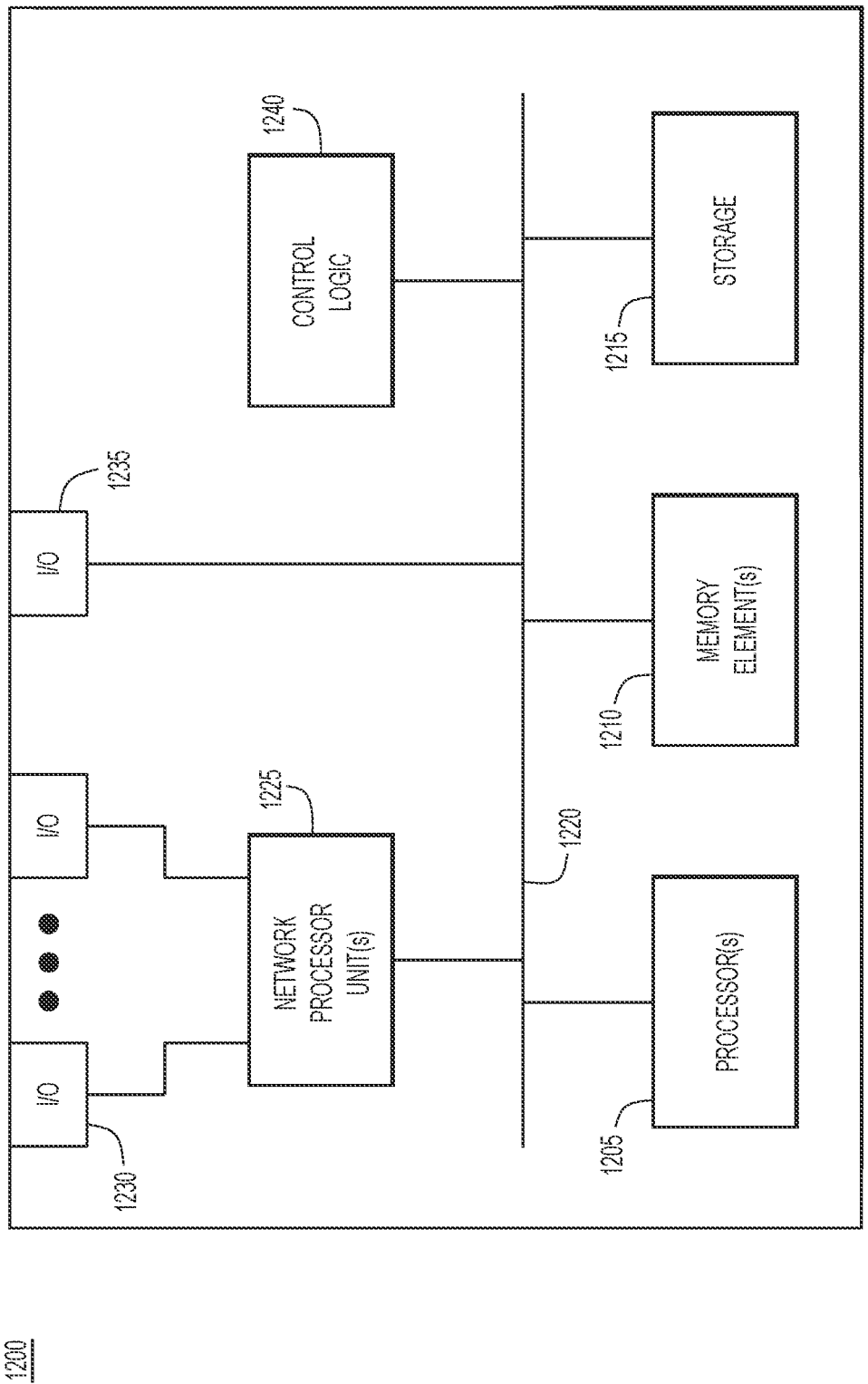
FIG. 12 is a block diagram of a computing device configured to perform functions associated with the techniques described herein, according to one or more example embodiments.

Referring now to FIG. 12, FIG. 12 illustrates a hardware block diagram of a computing device 1200 that may perform the operations of the autonomous system validation apparatus 350 shown in FIG. 3, and described herein in connection with the techniques depicted in FIGS. 1-11.

In various example embodiments, a computing device, such as computing device 1200 or any combination of computing devices 1200, may be configured as any entity/entities as discussed for the techniques depicted in connection with FIGS. 1-11 in order to perform operations of the various techniques discussed herein.

In at least one embodiment, computing device 1200 may include one or more processor(s) 1205, one or more memory element(s) 1210, storage 1215, a bus 1220, one or more network processor unit(s) 1225 interconnected with one or more network input/output (I/O) interface(s) 1230, one or more I/O interfaces(s) 1235, and control logic 1240. In various embodiments, instructions associated with logic for computing device 1200 can overlap in any manner and are not limited to the specific allocation of instructions and/or operations described herein.

In at least one embodiment, processor(s) 1205 is/are at least one hardware processor configured to execute various tasks, operations and/or functions for computing device 1200 as described herein according to software and/or instructions configured for computing device. Processor(s) 1205 (e.g., a hardware processor) can execute any type of instructions associated with data to achieve the operations detailed herein. In one example, processor(s) 1205 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1210 and/or storage 1215 is/are configured to store data, information, software, and/or instructions associated with computing device 1200, and/or logic configured for memory element(s) 1210 and/or storage 1215. For example, any logic described herein (e.g., control logic 1240) can, in various embodiments, be stored for computing device 1200 using any combination of memory element(s) 1210 and/or storage 1215. Note that in some embodiments, storage 1215 can be consolidated with memory element(s) 1210 (or vice versa), or can overlap/exist in any other suitable manner.

In at least one embodiment, bus 1220 can be configured as an interface that enables one or more elements of computing device 1200 to communicate in order to exchange information and/or data. Bus 1220 can be implemented with any architecture designed for passing control, data and/or information between processors, memory elements/storage, peripheral devices, and/or any other hardware and/or software components that may be configured for computing device 1200. In at least one embodiment, bus 1220 may be implemented as a fast kernel-hosted interconnect, potentially using shared memory between processes (e.g., logic), which can enable efficient communication paths between the processes.

In various embodiments, network processor unit(s) 1225 may enable communication between computing device 1200 and other systems, entities, etc., via network I/O interface(s) 1230 to facilitate operations discussed for various embodiments described herein. In various embodiments, network processor unit(s) 1225 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1230 can be configured as one or more Ethernet port(s), Fibre Channel ports, and/or any other I/O port(s) now known or hereafter developed. Thus, the network processor unit(s) 1225 and/or network I/O interfaces 1230 may include suitable interfaces for receiving, transmitting, and/or otherwise communicating data and/or information in a network environment.

I/O interface(s) 1235 allow for input and output of data and/or information with other entities that may be connected to computer device 1200. For example, I/O interface(s) 1235 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1240 can include instructions that, when executed, cause processor(s) 1205 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1240) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or nonvolatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1210 and/or storage 1215 can store data, software, code, instructions (e.g., processor instructions), logic, parameters, combinations thereof, and/or the like used for operations described herein. This includes memory element(s) 1210 and/or storage 1215 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, in one form, an apparatus is provided that includes a memory, a network interface configured to enable network communications, and a processor. The processor is configured to perform operations involving obtaining a test data set that includes a plurality of scenario categories for a vehicle to encounter along a test path and a scene failure rate of an autonomous driving system for each of the plurality of scenario categories, determining deployment scene-based metrics that include one or more of the plurality of scenario categories that are encountered by the vehicle in a deployment region, mapping the deployment scene-based metrics to the test data set to determine the scene failure rate for each of the one or more of plurality of scenario categories, and determining whether the autonomous driving system meets a minimum deployment standard in the deployment region based on mapping the deployment scene-based metrics and frequency of the one or more of the plurality of scenario categories in the deployment region.

In another form, the processor is configured to perform the operations including obtain a data set representing an environment in which a vehicle is driven autonomously or under control of an operator, where the data set includes a plurality of scenario categories and a scene failure rate for each of the plurality of scenario categories, mapping the data set to a distance-based metric to obtain miles per critical disengagement (MPCD) using scenes per unit distance and the scene failure rate, and determining whether an autonomous driving system meets a minimum deployment standard based on the MPCD.

In yet another form, one or more non-transitory computer readable storage media are provided encoded with instructions that, when executed by at least one processor, are operable to perform operations including: obtaining a test data set that includes a plurality of scenario categories for a vehicle to encounter along a test path and a scene failure rate of an autonomous driving system for each of the plurality of scenario categories, determining deployment scene-based metrics that include one or more of the plurality of scenario categories that are encountered by the vehicle in a deployment region, mapping the deployment scene-based metrics to the test data set to determine the scene failure rate for each of the one or more of plurality of scenario categories, and determining whether the autonomous driving system meets a minimum deployment standard in the deployment region based on mapping the deployment scene-based metrics and frequency of the one or more of the plurality of scenario categories in the deployment region.

In still another form, the instructions, when executed by at least one processor, are operable to perform operations including: obtain a data set representing an environment in which a vehicle is driven autonomously or under control of an operator, where the data set includes a plurality of scenario categories and a scene failure rate for each of the plurality of scenario categories, mapping the data set to a distance-based metric to obtain miles per critical disengagement (MPCD) using scenes per unit distance and the scene failure rate, and determining whether an autonomous driving system meets a minimum deployment standard based on the MPCD.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by a computing device, a test data set that includes a plurality of scenario categories for a vehicle to encounter along a test path and a scene failure rate of an autonomous driving system for each of the plurality of scenario categories;
   determining deployment scene-based metrics that include one or more of the plurality of scenario categories that are encountered by the vehicle in a deployment region;
   mapping the deployment scene-based metrics to the test data set to determine the scene failure rate for each of the one or more of the plurality of scenario categories;
   determining whether the autonomous driving system meets a minimum deployment standard in the deployment region using a distance-based metric, wherein the distance-based metric is obtained by mapping the deployment scene-based metrics and frequency of the one or more of the plurality of scenario categories in the deployment region; and
   deploying the vehicle that uses the autonomous driving system based on determining that the autonomous driving system meets the minimum deployment standard.

2. The method of claim 1, further comprising:
   generating the plurality of scenario categories, each of which is a combination of operation design domain (ODD) parameters and object and event detection response (OEDR) parameters.

3. The method of claim 2, wherein determining whether the autonomous driving system meets the minimum deployment standard includes:
   calculating an average failure rate for an overall distance in the deployment region that includes scenes of the deployment region in which no objects or events are encountered; and
   determining whether the average failure rate meets the minimum deployment standard.

4. The method of claim 3, wherein the average failure rate is in a form of a miles per critical disengagement (MPCD).

5. The method of claim 1, wherein the plurality of scenario categories are different from one another and wherein the plurality of scenario categories vary in at least complexity, length, encountered agents, or vehicle speed.

6. The method of claim 5, wherein the test data set includes a larger frequency of a complex scenario category than a less complex scenario category.

7. The method of claim 1, further comprising:
   generating an average failure rate in the distance-based metric based on the scene failure rate for each of the one or more of the plurality of scenario categories and the frequency of the one or more of the plurality of scenario categories.

8. The method of claim 1, wherein the test data set omits at least one scene category in which a plurality of scenes encounter no objects or events.

9. The method of claim 1, further comprising:
   determining a plurality of scene failure rates for the plurality of scenario categories; and
   determining an average failure rate based on scenes per unit distance.

10. The method of claim 1, further comprising:
    determining a number of scenes to use to evaluate the autonomous driving system based on an upper bound of the scene failure rate for each of the one or more of the plurality of scenario categories,
    wherein determining the distance-based metric includes adding a buffer distance without objects or events.

11. An apparatus comprising:
    a memory;
    a network interface configured to enable network communications; and
    a processor, wherein the processor is configured to perform operations comprising:
       obtaining a test data set that includes a plurality of scenario categories for a vehicle to encounter along a test path and a scene failure rate of an autonomous driving system for each of the plurality of scenario categories;
       determining deployment scene-based metrics that include one or more of the plurality of scenario categories that are encountered by the vehicle in a deployment region;
       mapping the deployment scene-based metrics to the test data set to determine the scene failure rate for each of the one or more of the plurality of scenario categories;
       determining whether the autonomous driving system meets a minimum deployment standard in the deployment region using a distance-based metric, wherein the distance-based metric is obtained by mapping the deployment scene-based metrics and a frequency of the one or more of the plurality of scenario categories in the deployment region; and
       control operations to deploy an autonomous vehicle that uses the autonomous driving system based on determining that the autonomous driving system meets the minimum deployment standard.

12. The apparatus of claim 11, wherein the processor is further configured to perform:
    generating the plurality of scenario categories, each of which is a combination of operation design domain (ODD) parameters and object and event detection response (OEDR) parameters.

13. The apparatus of claim 12, wherein the processor is configured to perform the operation of determining whether the autonomous driving system meets the minimum deployment standard by:
    calculating an average failure rate for an overall distance in the deployment region that includes scenes of the deployment region in which no objects or events are encountered; and
    determining whether the average failure rate meets the minimum deployment standard.

14. The apparatus of claim 13, wherein the average failure rate is in a form of a miles per critical disengagement (MPCD).

15. The apparatus of claim 11, wherein the plurality of scenario categories are different from one another and wherein the plurality of scenario categories vary in at least complexity, length, encountered agents, or vehicle speed.

16. The apparatus of claim 15, wherein the test data set includes a larger frequency of a complex scenario category than a less complex scenario category.

17. The apparatus of claim 11, wherein the processor is further configured to perform:
    generating an average failure rate in the distance-based metric based on the scene failure rate for each of the one or more of the plurality of scenario categories and the frequency of the one or more of the plurality of scenario categories.

18. One or more non-transitory computer readable storage media encoded with instructions that, when executed by a processor, cause the processor to execute a method comprising:
    obtaining a test data set that includes a plurality of scenario categories for a vehicle to encounter along a test path and a scene failure rate of an autonomous driving system for each of the plurality of scenario categories;
    determining deployment scene-based metrics that include one or more of the plurality of scenario categories that are encountered by the vehicle in a deployment region;
    mapping the deployment scene-based metrics to the test data set to determine the scene failure rate for each of the one or more of the plurality of scenario categories;
    determining whether the autonomous driving system meets a minimum deployment standard in the deployment region using a distance-based metric, wherein the distance-based metric is obtained by mapping the deployment scene-based metrics and frequency of the one or more of the plurality of scenario categories in the deployment region; and
    deploying an autonomous vehicle that uses the autonomous driving system based on determining that the autonomous driving system meets the minimum deployment standard.

19. The one or more non-transitory computer readable storage media of claim 18, wherein the method further comprises:

generating the plurality of scenario categories, each of which is a combination of operation design domain (ODD) parameters and object and event detection response (OEDR) parameters.

20. The one or more non-transitory computer readable storage media of claim 19, wherein determining whether the autonomous driving system meets the minimum deployment standard includes:
- calculating an average failure rate for an overall distance in the deployment region that includes scenes of the deployment region in which no objects or events are encountered; and
- determining whether the average failure rate meets the minimum deployment standard.

* * * * *